Patented July 9, 1946

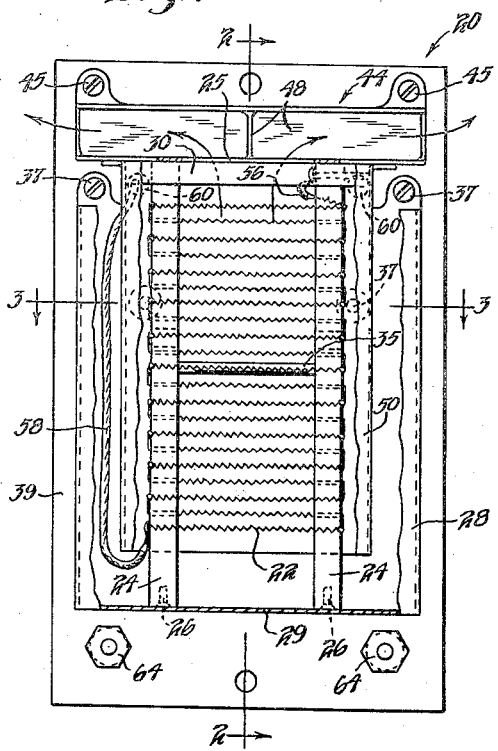
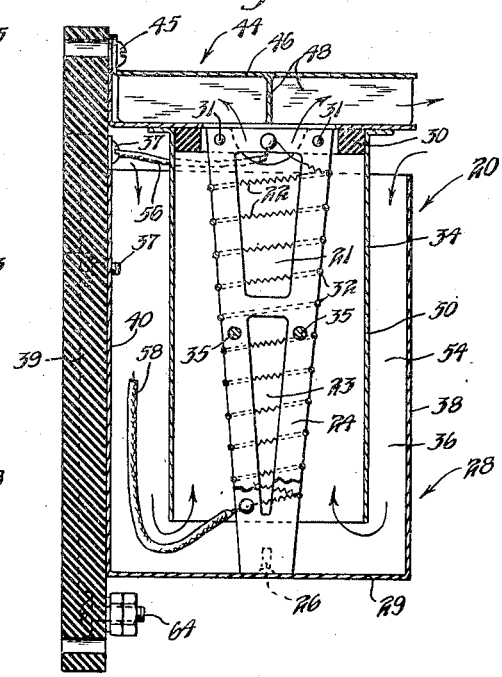
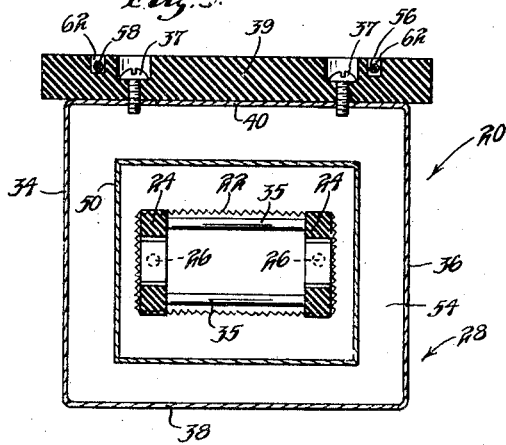

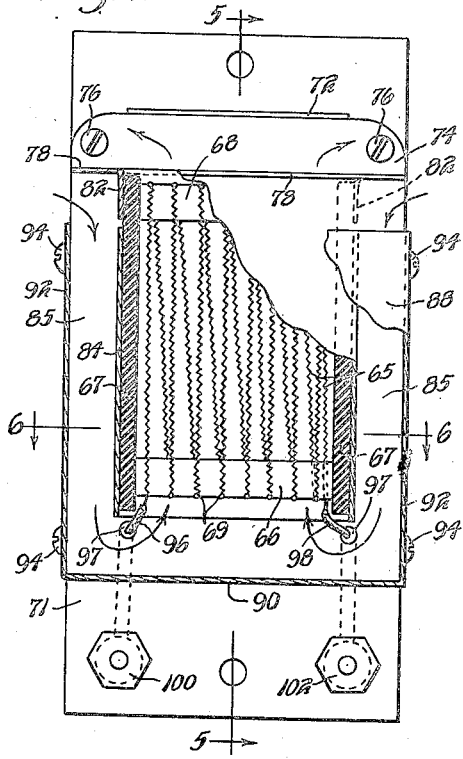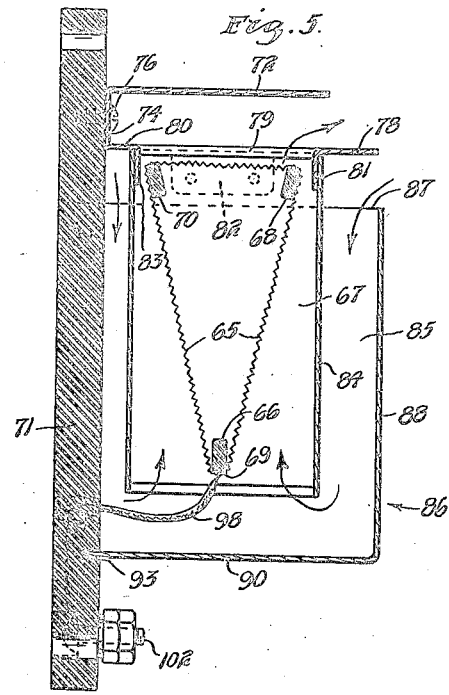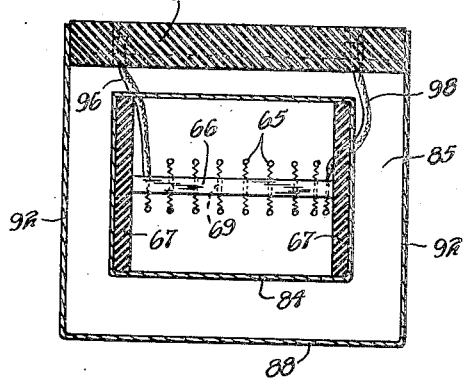

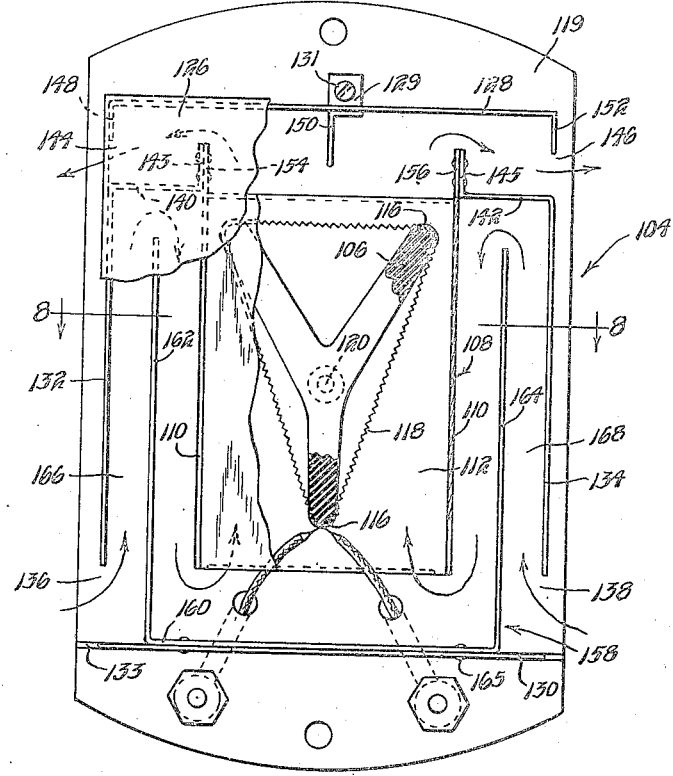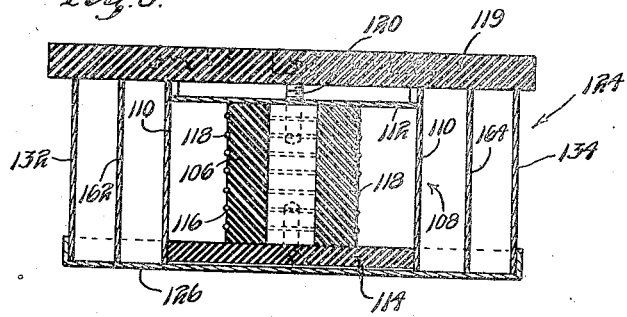

2,403,843

UNITED STATES PATENT OFFICE 2,403,843

RESISTANCE BULB THERMOSTAT

Vilynn O. Beam, Benjamin Cyr, and John M. Wilson, Minneapolis, Minn., assignors to Minneapolis-Honeywell Regulator Company, Minneapolis, Minn., a corporation of Delaware Application November 3, 1943, Serial No. 508,839

20 Claims. (Cl. 201—63)

This invention relates to a temperature responsive device comprising a resistance element having a high temperature coefficient of resistance which is responsive to a change in a condition.

This invention relates specifically to a room thermostat comprising an electrical resistance element which has a high degree of sensitivity to change in a condition and which is provided with a baffle arrangement for guiding air in a tortuous path so that the rate of air movement through the thermostat remains substantially constant.

This invention further relates to a temperature responsive device and more particularly to a thermostat comprising a resistance element for use in the electrical measurement of the temperature of air in a space.

This invention utilizes in a resistance thermostat a relatively long resistance element of high coefficient of resistance such as a fine wire which is open wound on different framework constructions and wherein a relatively high wattage is used, as compared to such a resistance unit for use with an ordinary direct current galvanometer type of instrument so as to obtain high sensitivity. It is desired to have a considerable change in electrical characteristics or resistance upon a relatively small change in temperature and without any particular amount of lag, and to accomplish this, the relatively long resistance wire, the open winding, and the relatively high wattage must be utilized. The wattage employed in the resistance element is such that sufficient heat is generated as to actually provide a chimney effect. The difficulty in employing such an instrument is that the occurrence of unusual drafts, as perhaps the opening of a door, a person walking close to the thermostat, or some other abnormal transient condition, will cause a response of the thermostat which does not represent an average condition of the air in a room. So as to eliminate such abnormal air disturbances, it has been found necessary to provide means to protect the sensitive element from the effects of such transient and abnormal conditions without materially affecting its normal sensitivity. In the present invention, different baffle arrangements are utilized so that the response of the apparatus is not materially affected by a temporary change in the rate of air movement at or near the thermostat. The baffle arrangements are designed to slow down the rate of flow of air through the thermostat. That is, the resistance element is so protected that it will give substantially the same response for a given temperature of air even though the rate of air movement near the thermostat is temporarily increased. Where the baffle arrangement is employed the air has to take a tortuous or circuitous path whereby the rate of air movement remains substantially constant even upon the occurrence of temporarily increased air movement in the neighborhood of the thermostat. These baffle arrangements might be said to provide means for damping the effects of variations in air velocity in the vicinity of the thermostat so that the thermostat responds not only to the general ambient temperature of the space in which it is located but also its response is governed by the general average air movement in the complete space as distinguished from any temporary abnormal transient air movements.

It is the primary object of our invention to provide an effective temperature responsive device such as a space thermostat of the resistance element type which is provided with a baffle housing for guiding air in a tortuous path or paths so that the rate of air movement remains substantially constant whereby the thermostat not only responds to the general ambient temperature of the space in which it is located but is responsive to the general average air movement in the complete space.

It is another object of this invention to provide a temperature responsive device having a resistance element which is a relatively long spirally wound wire.

It is another object of this invention to provide a temperature responsive device having a resistance element which is a relatively long spirally wound wire mounted on an open framework.

It is still another object of this invention to provide a thermostat comprising a resistance element having a high temperature coefficient of resistance in which the temperature of the ambient atmosphere regulates the flow of current through the resistance element.

It is still a further object of this invention to provide a resistance thermostat which has a considerable change in electrical characteristic or resistance upon a relatively small change in temperature without any particular amount of lag.

It is another object of this invention to provide a resistance bulb thermostat which utilizes a relatively high wattage input.

Other and further objects will become apparent upon a study of the specification and claims in conjunction with the accompanying drawings wherein are illustrated the preferred forms of our invention.

Figure 1 is a front elevational view of a temperature responsive device with parts being broken away disclosing the resistance element wound on a frame member.

Figure 2 is a vertical sectional view taken on line 2—2 of Figure 1.

Figure 3 is a horizontal sectional view taken on line 3—3 of Figure 1.

Figure 4 is a front elevational view of a modified form of the resistance thermostat parts being broken away.

Figure 5 is a vertical sectional view taken on line 5—5 of Figure 4.

Figure 6 is a horizontal sectional view taken on line 6—6 of Figure 4.

Figure 7 is another modification of the resistance thermostat disclosing a vertical elevational view of the front thereof, with parts being broken away, and Figure 8 is a sectional view taken on line 8—8 of Figure 7.

Referring to the drawings in detail, 20 designates a resistance bulb thermostat as illustrated in Figures 1, 2, and 3. Thermostat 20 specifically comprises a fine spirally wound resistance wire element 22 of a high temperature coefficient of resistance which is relatively long mounted horizontally on a pair of spaced-apart substantially triangular plastic leg members 24 having openings 21 and 23. A housing 28 comprising sides 34 and 36, a front portion 38, a back portion 40, a bottom 29, and an open top is spaced about the resistance element 22. The rear portion 40 of the housing 28 is secured to an insulation base plate 39 by screws 37. The triangular leg members 24 are secured by screw means 26 to the bottom 29 of the housing 28 and the leg members 24 are also secured by pin means 31 to a rectangular frame member 30 spaced above the top of the housing 28. The rectangular frame member 30 is provided with an opening 25. The two triangular shaped leg members 24 are spaced at opposed sides of the rectangular frame member 30 and pins 35 aid in securing the triangular leg members together in spaced-apart relationship. Each of the leg members 24 has notches 32 on its front and rear surfaces in which the spirally wound resistance wire 22 is mounted.

A baffle member 44 is attached by screw means 45 to the insulation base plate 39 adjacent the top of the triangular leg members 24. This baffle member 44 comprises a top plate 46 and two depending intersecting flanges 48 which divide the baffle member into four substantially equal spaces. A metal shield 50 which is open at its top and bottom is located in the housing 28 and the shield 50 is secured at its top portion to the depending flanges 48 of the baffle 44. The shield 50 is spaced from the triangular legs 24 which carries the resistance element 22, and the shield is also spaced from the bottom 29, sides 34 and 36, front portion 38 and rear portion 40 of the housing 28. Thus, there is a passageway 54 formed between the housing 28 and the metal shield 50 which communicates air of the room space with the bottom of the shield 50. The air thence rises over the resistance element 22 and emerges out through the open top of the shield 50.

Conductors 56 and 58 are connected respectively to the opposite ends of the spirally wound resistance wire 22 and lead from the resistance wire 22 through apertures 60 in the base plate 39 and the apertures communicate with channels 62 for receiving the conductors 56 and 58 respectively, which extend to terminal posts 64.

Another form of the resistance thermostat is illustrated in Figures 4, 5, and 6. The thermostat comprises a spirally wound resistance wire 65 having a high temperature coefficient of resistance. There is a frame member of insulation material for mounting the resistance wire 65 comprising opposed sides 67 and three arm members 66, 68 and 70 which are secured between the opposed sides 67. One of the arms 66 is spaced between the lower central portion of the opposed sides 67, while the other two arms 68 and 70 are spaced between and adjacent the top of the opposed sides 67 with arm 68 adjacent the front portion of the opposed sides and the other arm 70 adjacent the back portion of the opposed sides 67. The bottom side of the lower arm 66 and the upper side of the two uppermost arms 68 and 70 have notches 69 so that the spirally wound wire can be mounted vertically on the three arms thus forming a triangular shaped resistance element with the apex at the bottom of the opposed sides 67. Baffle member 72 is spaced above the top of the frame carrying the resistance wire 65 and comprises a right angular depending flange portion 74 which is secured by screw means 76 to a base or terminal plate 71. A rectangular frame member 78 having an opening 79 extends substantially at right angles from the depending flange portion 74 and is spaced outwardly from and above the resistance element 65. The rear side 80 of the rectangular frame member 78 spaces the frame carrying the resistance element 65 from the base plate 71. Rectangular frame member 78 has opposed depending ear members 82 which are attached to the opposed sides 67 of the insulation frame member. The frame member 78 also comprises depending flanges 81 and 83 at the front and rear portions, respectively. A metal shield member 84 open at the top and bottom is secured to the depending flanges 81 and 83 of the rectangular frame member 78. The metal shield member 84 is spaced from and surrounds the resistance element 65.

A housing 86 comprising a bottom 90, front side 88, and opposed sides 92, is spaced from the bottom, front and opposed sides of the shield 84. The bottom 90 of the housing 86 fits into a groove 93 of the base 71. The opposed sides 92 of the housing 86 are secured by screws 94 to the opposed sides of the base member 71. The housing 86 is open at the top and is spaced below the rectangular frame member 78. This construction allows air to communicate with a passageway 85 between the housing 86 and the shield 84 and the air thus communicates with the bottom of the shield 84 and contacts the resistance wire 65. The air then travels up the inside of the shield 84 and over the resistance element 65, and then emerges out through the open top of the shield 84 to enter the room space.

Conductors 96 and 98 connect to the opposite ends of the spirally wound resistance wire 65 and respectively extend through apertures 97 in the base plate 71 and connect respectively with terminals 100 and 102. These terminals 100 and 102 are adapted to be connected with an electrical circuit (not shown).

Figures 7 and 8 designate a third form of the resistance bulb thermostat which is designated as 104. The Y-shaped member 106 of insulation material is mounted within a shield member 108 comprising opposed sides 110, rear side 112, and a front portion 114. The shield 108 is open at its top and bottom. The arms of the Y-shaped frame member are spaced near the upper portion of the shield 108 with the leg portion extending toward the bottom thereof. The Y-shaped frame member 106 is spaced in the shield 108 so that the arms of the frame member are disposed adjacent the sides 110 and the leg portion being intermediate the sides 110. The tip of the arms and the bottom of the leg member of the Y-shaped frame member 106 are notched as shown at 116 for mounting a fine spirally wound resistance wire 118 having a high temperature coefficient of resistance thereon. The spirally wound resistance wire 118 is mounted vertically on the frame member 106 and extends around the frame of the Y-shaped member 106 and only contacts the frame at the bottom end of the leg and the top of the arms. The Y-shaped frame member 106 and the shield 108 are both secured to an insulation base member 119 by screw member 120.

A baffle housing 124 comprising a front portion 126, an upper portion 128, a bottom 130, and opposed sides 132 and 134 surrounds the shield member 108 and is spaced from the opposite sides 110 and the open bottom and top of the shield. The portion 128 of the baffle housing 124 is secured through a lug member 129 to the base or terminal panel 119 by screw means 131. A groove 133 in the terminal plate 119 receives an edge of the bottom 130 of the housing 124 for securing this portion of the housing to the plate 119. Each of the opposed sides 132 and 134 are spaced from the bottom 130 thereby forming openings 136 and 138 into the baffle housing 124. The opposed sides 132 and 134 of the baffle housing 124 have angular flange members 140 and 142, respectively, spaced from the top portion 128 of the baffle housing providing openings 144 and 146 in the opposed sides of the baffle housing. The angular flanges 140 and 142 have a projecting portion 143 and 145, respectively. The top 128 of the baffle housing 124 has depending flange members 148, 150, and 152. Depending flange members 148 and 152 are respectively spaced from the angular flange members 140 and 142 of the sides 132 and 134, respectively, of the baffle housing 124. Shield member 108 has projecting members 154 and 156 which are spaced adjacent and secured to the projecting portions 143 and 145 of the angular flanges 140 and 142. Projecting member 154 is substantially intermediate the flanges 148 and 150, and projecting member 156 is spaced between flanges 150 and 152. There is an angular bar member 158 comprising a base portion 160 and vertically projecting arms 162 and 164. Base portion 160 of the angular bar 158 is fastened to the bottom 130 of the baffle housing 124 by rivets or the like means 165, and the vertical members 162 and 164 are spaced intermediate the opposed sides 132 and 134 of the baffle housing and the opposite sides 110 of the shield member 108, respectively. The vertical members 162 and 164 are respectively spaced from the angular members 140 and 142 of the opposed sides 132 and 134 of the baffle housing 124. Tortuous passageways are thus formed in the baffle housing 124 and shield 108. A tortuous passageway 166 is formed which extends between the side 132 and vertical member 162 of the angular bar 158, then over the top of the vertical element 162 and down between the vertical element 162 and the adjacent side 110 of the shield 108, thence up through the shield 108 which supports the resistance element, then out of the top of shield 108 and over the projecting portion 154 of the shield and then out through the opening 144. A similar tortuous passageway 168 is formed through the other side of the baffle housing 124 and shield 108 which communicates with the openings 138 and 146 at the bottom and top of the housing 124, respectively.

In all of the thermostat devices disclosed in this application, the air is guided through tortuous paths in heat transfer relationship with the resistance element of the thermostat. Where the air is conducted indirectly to the resistance element, the temperature of the air is measured very accurately, and there is no introduction of an anemometer effect.

Various changes and modifications of this invention may occur to those who are skilled in the art, and we wish it to be understood that we intend to be limited only by the scope of the appended claims and not by the specific embodiments disclosed herein.

We claim as our invention:

1. In a thermostatic device comprising a resistance element of high temperature coefficient of resistance, a frame member, the resistance element mounted on the frame member, means for guiding air in a tortuous path in heat transfer relationship with the resistance element, the resistance element being instantly and only responsive to the temperature of the air flowing through the tortuous means, and means for mounting the thermostatic device.

2. In a thermostatic device comprising a resistance element of high temperature coefficient of resistance, a frame member, the resistance element being mounted on the frame member, and baffle means for guiding air in heat transfer relationship with the resistance element whereby there is a constant flow of air through the thermostatic device and the resistance element responsive only to the temperature of the air flowing through the baffle means.

3. A thermostat comprising a resistance element of high temperature coefficient of resistance, an open frame member, the resistance element mounted in substantially non-contactual relationship on the frame member, a shield member surrounding the frame member carrying the resistance element, the shield member being open at the top and bottom for guiding air in heat transfer relationship with the resistance element whereby the resistance element is responsive only to the temperature of the ambient air guided into heat transfer relationship with it.

4. A thermostat comprising a resistance element of fine spirally wound wire having a high temperature coefficient of resistance, a frame member, the resistance element mounted on the frame member, a shield member surrounding the frame member carrying the resistance element, the shield member being open at the top and bottom, a baffle member mounted over the top of the shield member for preventing air currents affecting the resistance element, the shield and baffle member guiding air in heat transfer relationship with the resistance element whereby the resistance element is responsive to the temperature of the air flowing through the shield, and means for mounting the thermostat.

5. A thermostat comprising a resistance element of high temperature coefficient of resistance, a frame member, the resistance element mounted on the frame member, a shield member surrounding the frame member carrying the resistance element, the shield member being open at the top and bottom, a baffle member mounted above the top of the shield member, an open top housing surrounding the shield member, the shield member, and housing member providing tortuous passageways for guiding air in heat transfer relationship with the resistance element whereby the resistance element is responsive only to the temperature of the air flowing past the resistance element.

6. In a thermostatic device comprising a resistance element of high temperature coefficient of resistance, a frame member, the resistance element mounted on the frame member, a shield member surrounding the frame member carrying the resistance element, the shield member being open at the top and bottom, and a housing having an open top surrounding the shield member and being spaced from the shield member on all sides thereby providing tortuous passageways for guiding air in heat transfer relationship with the resistance element, and the resistance element being responsive to the temperature of the air flowing past it.

7. In a thermostatic device comprising a resistance element of high temperature coefficient of resistance, a frame member, the resistance element mounted on the frame member, and means comprising spaced apart elements providing circuitous paths for guiding air in heat transfer relationship with the resistance element whereby the resistance element is responsive to the temperature of the air guided by it.

8. In a thermostatic device comprising a resistance element having high temperature coefficient of resistance, a frame member, the resistance element mounted on the frame member, a baffle housing surrounding the frame member carrying the resistance element providing tortuous passageways for guiding a constant flow of air in heat transfer relationship with the resistance element and the resistance element being responsive only to the temperature of the ambient air flowing past it.

9. In a thermostatic device comprising a fine spirally wound resistance wire having high temperature coefficient of resistance, a frame member, the resistance wire mounted on the frame member, a baffle housing surrounding the frame member carrying the resistance wire providing tortuous passageways in the housing whereby the resistance element is responsive to the average air movement of a space, and means for supporting the thermostatic device.

10. In a thermostatic device comprising a fine spirally wound resistance element having high temperature coefficient of resistance, a frame member, the resistance element mounted on the frame member, a baffle housing surrounding the frame member carrying the resistance element providing tortuous passageways in the housing for guiding air in heat transfer relationship with the resistance element whereby the resistance element is only responsive to the temperature of the air flowing by it, and means for supporting the thermostatic device.

11. In a thermostatic device comprising a fine spirally wound resistance wire having high temperature coefficient of resistance, a Y-shaped frame member, the resistance wire mounted on the Y-shaped frame member providing a triangular shaped resistance unit whereby a relatively large area of the resistance wire is exposed to air, a baffle housing surrounding the frame member carrying the resistance wire providing tortuous passageways for the flow of air through the housing, and means for mounting the thermostatic device.

12. A thermostatic device comprising a resistance element of high temperature coefficient of resistance, means for mounting the resistance element, and baffle means providing tortuous paths for guiding air in heat transfer relationship with the resistance element and the resistance element being responsive only to the temperature of the air flowing through the tortuous paths.

13. In a thermostat comprising a relatively long resistance element of fine spirally wound wire having a high temperature coefficient of resistance, means for mounting the resistance element, and tortuous means for damping the effects of variations in air velocity of a space on the resistance element whereby the responsive element only responds to the average ambient temperature and average air movement in the space.

14. In a thermostat comprising a relatively long resistance element of fine spirally wound wire having a high temperature coefficient of resistance, an open frame work mounting the resistance element in substantially non-contactual relationship, the resistance element having a relatively high wattage input, the resistance element having a relatively wide variation in resistance upon a small change in temperature, and means for moderating the effects of variations in air velocity in a space on the resistance element whereby the resistance element responds to the average air movement in the space.

15. A thermostat comprising a resistance element having high temperature coefficient of resistance, baffle means providing a tortuous path for guiding air in heat transfer relationship with the resistance element, and the resistance element being only responsive to the temperature of the air flowing through the tortuous path.

16. In a thermostat comprising a resistance element of high temperature coefficient of resistance, a frame member mounting the resistance element in a substantially triangular-shaped unit, a shield open at the top and bottom surrounding the resistance element, an open top housing member spaced from the shield member providing a passageway between the shield and housing, the passageway between the housing and shield guiding air from the top of the housing to substantially the bottom thereof before the air enters the inside of the shield member at its bottom end for contacting the resistance element in heat transfer relationship, and the air finally passing out of the shield member at its top in close proximity to the point of entrance of the air into the housing member whereby the resistance element is only responsive to the temperature of the air flowing past it.

17. In a thermostat comprising a shield member, a resistance element of high temperature coefficient of resistance, a frame member comprising two spaced apart triangular-shaped legs, the triangular-shaped legs having their apex portions adjacent the bottom of the shield member, the frame member mounting the resistance element into a unit whereby the size of the resistance unit gradually increases from the bottom to the top of the shield, the shield member open at the top and bottom surrounding the resistance element, an open top housing member spaced from the shield member providing a passageway between the shield and housing, the passageway between the housing and shield guiding air from the top of the housing to substantially the bottom thereof before the air enters the inside of the shield member at its bottom for contacting the resistance element in heat transfer relationship, and the air finally passing out of the shield member at its top in close proximity to the point of entrance of the air into the housing member whereby the resistance element is only responsive to the temperature of the air flowing past it.

18. In a thermostatic device comprising a resistance element of high temperature coefficient of resistance, a frame member, the resistance element mounted on the frame, means for guiding air in a tortuous path in heat transfer relationship with the resistance element, the resistance element being instantly and only responsive to the temperature of the air flowing through the tortuous means.

19. In a thermostatic device comprising a fine spirally wound resistance wire having high temperature coefficient of resistance, a frame member mounting the resistance element in a substantially triangular shaped unit, a baffle housing surrounding the frame member carrying the resistance wire providing tortuous passageways for the flow of air through the housing.

20. In a space thermostat comprising a resistance element of high temperature coefficient of resistance, a frame member mounting the resistance element in a substantially triangular shaped unit, a shield being open at the top and bottom surrounding the resistance element, a baffle member located over the top of the shield member, the shield member having communication with the baffle member, an open top housing member spaced from the shield and baffle members providing a passageway between the shield and housing, the passageway between the housing and shield guiding air from the top of the housing to substantially the bottom thereof before the air enters the inside of the shield member at its bottom end for contacting the resistance element in heat transfer relationship, the air emerging out of the top of the shield member into the baffle member, then the air finally passing out of the baffle member into the space in close proximity to the point of entrance of the air into the housing member whereby the resistance element is only responsive to the temperature of the air flowing past it.

VILYNN O. BEAM.
BENJAMIN CYR.
JOHN M. WILSON.